United States Patent [19]
Scherzer

[11] Patent Number: 6,108,565
[45] Date of Patent: Aug. 22, 2000

[54] PRACTICAL SPACE-TIME RADIO METHOD FOR CDMA COMMUNICATION CAPACITY ENHANCEMENT

[75] Inventor: Shimon B. Scherzer, Sunnyvale, Calif.

[73] Assignee: Adaptive Telecom, Inc., Sunnyvale, Calif.

[21] Appl. No.: 08/929,638

[22] Filed: Sep. 15, 1997

[51] Int. Cl.[7] .................................................. H04Q 7/38
[52] U.S. Cl. .......................................... 455/562; 455/550
[58] Field of Search .................................. 370/210, 335, 370/342, 441, 479, 310, 329; 375/200, 208, 267, 347, 209, 210; 455/501, 42, 506, 13.3, 62, 63, 561, 562, 509, 550

[56] References Cited

U.S. PATENT DOCUMENTS

| | | | |
|---|---|---|---|
| 5,434,578 | 7/1995 | Stehlik | 342/383 |
| 5,471,647 | 11/1995 | Gerlach et al. | 455/63 |
| 5,546,090 | 8/1996 | Roy, III et al. | 342/51 |
| 5,563,610 | 10/1996 | Reudink | 342/375 |
| 5,592,490 | 1/1997 | Barrat et al. | 370/310 |
| 5,604,732 | 2/1997 | Kim et al. | 375/206 |
| 5,634,199 | 5/1997 | Gerlach et al. | 455/63 |
| 5,642,353 | 6/1997 | Roy, III et al. | 370/329 |
| 5,828,658 | 10/1998 | Ottersten et al. | 370/329 |
| 5,848,060 | 12/1998 | Dent | 455/12.1 |
| 5,886,988 | 3/1999 | Yun et al. | 455/509 |
| 5,905,721 | 5/1999 | Liu et al. | 370/342 |

*Primary Examiner*—Dwayne D. Bost
*Assistant Examiner*—Jean Gelin
*Attorney, Agent, or Firm*—Lumen Intellectual Property Services

[57] ABSTRACT

A practical way to enhance signal quality (carrier to interference. C/I) in both up and downlink of wireless point to multi-point CDMA service implements basic radio direction finding techniques to allow for optimal diversity combining in an antenna array employing large number of elements. This approach is facilitated through the use of very small bit counts arithmetic and capitalizing on finite alphabet signal structure (Walsh symbols, for example in IS-95 CDMA) or a known training sequence. Alternate implementations can use floating point data representations. The method facilitates ASIC implementation, thereby enabling distributed processing to achieve the required computation practicality. The method utilizes the uplink channel data to determine the downlink spatial structure (array beams) to enhance downlink C/I and hence, increase downlink capacity. The preferred embodiment is optimized to IS-95, however, any signal that has either a finite alphabet or a training sequence built in can utilize the same idea. The use of the known signal structure facilitates simple array response vector determination and eliminates the necessity for covariance matrix calculation and analysis. Hence, this approach can be utilized for GSM and TDMA wireless air-interfaces as well.

32 Claims, 13 Drawing Sheets ns so that the uplink signal is received with maximum
PRACTICAL SPACE-TIME RADIO METHOD FOR CDMA COMMUNICATION CAPACITY ENHANCEMENT This application is related to U.S. Disclosure Document Number 405,643 filed Sep. 23, 1996, which is incorporated herein by reference.

FIELD OF INVENTION

The present invention relates to wireless communication systems. More specifically, the invention relates to methods for enhancement of wireless communication performance by exploiting the spatial domain, and practical systems for implementing such methods.

BACKGROUND

Due to the increasing demand for wireless communication, it has become necessary to develop techniques for more efficiently using the allocated frequency bands, i.e. increasing the capacity to communicate information within a limited available bandwidth. In conventional low capacity wireless communication systems, information is transmitted from a base station to subscribers by broadcasting omnidirectional signals on one of several predetermined frequency channels. Similarly, the subscribers transmit information back to the base station by broadcasting similar signals on one of the frequency channels. In this system, multiple users independently access the system through the division of the frequency band into distinct subband frequency channels. This technique is known as frequency division multiple access (FDMA).

A standard technique used by commercial wireless phone systems to increasing capacity is to divide the service region into spatial cells. Instead of using just one base station to serve all users in the region, a collection of base stations are used to independently service separate spatial cells. In such a cellular system, multiple users can reuse the same frequency channel without interfering with each other, provided they access the system from different spatial cells. The cellular concept, therefore, is a simple type of spatial division multiple access (SDMA).

In the case of digital communication, additional techniques can be used to increase capacity. A few well known examples are time division multiple access (TDMA) and code division multiple access (CDMA). TDMA allows several users to share a single frequency channel by assigning their data to distinct time slots. CDMA is normally a spread-spectrum technique that does not limit individual signals to narrow frequency channels but spreads them throughout the frequency spectrum of the entire band. Signals sharing the band are distinguished by assigning them different orthogonal digital code sequences. CDMA has been considered the most promising method among the various air-interfaces in the industry, as shown by theoretical analysis (See, for example, Andrew J. Viterbi, *CDMA Principles of Spread Spectrum Communications*, and Vijay K. Garg et al., *Applications of CDMA in Wireless/Personal Communications*.

Despite the promise of CDMA, practical issues such as power control speed and inter-base station interference considerably limited system effectiveness in its initial phase of implementation. CDMA based system capacity depends very much on the ability to provide for very accurate power control; but in a mobile environment, the signal may fluctuate too fast for the system to control. Unfortunately, mobile wireless environments are often characterized by unstable signal propagation, severe signal attenuation between the communicating entities and co-channel interference by other radio sources. Moreover, many urban environments contain a significant number of reflectors (such as buildings), causing a signal to follow multiple paths from the transmitter to the receiver. Because the separate parts of such a multipath signal can arrive with different phases that destructively interfere, multipath can result in unpredictable signal fading. In addition, in order to provide service to shadowed areas, radiated power is increased, thereby increasing inter base station interference and degrading system performance significantly.

Recently, considerable attention has focused on ways to increase wireless system performance by further exploiting the spatial domain. It is well recognized that SDMA techniques, in principle, could significantly improve the CDMA based network performance. These techniques have varying degrees of sophistication and complexity. Currently proposed approaches are either simple but not very effective or effective but too complex for practical implementation.

One well-known SDMA technique is to provide the base station with a set of independently controlled directional antennas, thereby dividing the cell into separate sectors, each controlled by a separate antenna. As a result, the frequency reuse in the system can be increased and/or cochannel interference can be reduced. Instead of independently controlled directional antennas, this technique can also be implemented with a coherently controlled antenna array. Using a signal processor to control the relative phases of the signals applied to the antenna elements, predetermined beams can be formed in the directions of the separate sectors. Similar signal processing can be used to selectively receive signals only from within the distinct sectors. These simple sectoring techniques, however, only provide a relatively small increase in capacity.

U.S. Pat. No. 5,563,610 discloses a method for mitigating signal fading due to multipath in a CDMA system. By introducing intentional delays into received signals, non-correlated fading signal components can be better differentiated by the RAKE receiver. Although this diversity method can reduce the effects of fading, it does not take advantage of the spatial domain and does not directly increase system capacity. Moreover, this approach, which combines angular and time diversity using a fixed beams configuration, is not effective since either the beams outputs are significantly different in level or they are similar in level but highly correlated. If two signal parts are arriving from similar direction, they are passing through one beam and thus are non differentiable. If the signal parts are arriving between beams, on the other hand, the levels are similar but the they are well correlated.

More sophisticated SDMA techniques have been proposed that could dramatically increase system capacity. For example, U.S. Pat. No. 5,471,647 and U.S. Pat. No. 5,634,199, both to Gerlach et al., and U.S. Pat. No. 5,592,490 to Barratt et al. disclose wireless communication systems that increase performance by exploiting the spatial domain. In the downlink, the base station determines the spatial channel of each subscriber and uses this channel information to adaptively control its antenna array to form customized narrow beams. These beams transmit an information signal over multiple paths so that the signal arrives to the subscriber with maximum strength. The beams can also be selected to direct nulls to other subscribers so that cochannel interference is reduced. In the uplink, the base station uses the channel information to spatially filter the received signals so that the uplink signal is received with maximum sensitivity and distinguished from the signals transmitted by other subscribers. Through selective power delivery by intelligent directional beams, the inter base station interference and the carrier to interference ratio at the base station receivers can be reduced.

The biggest issue in adaptive beamforming is how to quickly estimate the wireless air channel to allow for effective beams allocation. In the uplink, there are known signal processing techniques for estimating the spatial channel from the signals received at the base station antenna array. These techniques conventionally involve an inversion or singular value decomposition of a signal covariance matrix. The computational complexity of this calculation, however, is so high that it is presently not practical to implement. These highly complex approaches capitalize on the theory of array signal processing. This approach estimates the uplink channel (e.g. the angles and times of arrival of the multipath signal parts) to create a space-time matched filter to allow for maximum signal delivery. The proposed method involves computation of a signal covariance matrix and derivation of its eigenvectors to determine the array coefficients. The basic problem of array signal processing is formulated in the following expression:

$$X=AS+N$$

where X is a matrix of antenna array signal snapshots (each column incorporates snapshots of all antenna elements), S is the transmitted signal matrix (each column incorporates snapshots of the information signal, A is the antenna array & channel response matrix, and N is the noise matrix. The main challenge of array signal processing is to estimate S based on the statistics of A and S, that is, to reliably and correctly estimate all the incoming signals with presence of interference and thermal noise, N. This problem has been a subject for extensive research for several years. Two well known estimating algorithms involve Maximum Likelihood Sequence Estimation (MLSE) and Minimum Mean Square Error (MMSE). Using these techniques, if S represents signals with known properties such as constant modules (CM), or finite alphabet (FA), the process can be executed using the known signal's temporal structure statistics. If the array manifold is known, than convergence can be made faster. This process, however, is very computational intensive. In a base station that is required to simultaneously support more than 100 mobile units, the computation power is presently beyond practical realization.

Most adaptive beam forming methods described in the art (e.g. U.S. Pat. No. 5,434,578) deal extensively with uplink estimation, while requiring extensive computation resources. Few, however, deal with downlink estimation, which is a more difficult problem. Because the spatial channel is frequency dependent and the uplink and downlink frequencies are often different, the uplink beamforming techniques do not provide the base station with sufficient information to derive the downlink spatial channel information and improve system capacity. One technique for obtaining downlink channel information is to use feedback from the subscriber. The required feedback rates, however, make this approach impractical to implement.

There is a need, therefore, for significantly increasing wireless system capacity using beamforming methods that overcome the limitations in the known approaches.

SUMMARY OF THE INVENTION

The present invention provides a method for wireless communication that exploits the spatial domain in both uplink and downlink without requiring computationally complex processing. The method provides for significant capacity enhancement in both uplink and downlink while maintaining implementation simplicity. This goal is achieved by eliminating the necessity for covariance matrix processing, using low bit count arithmetic and by capitalizing on signal multipath structures.

A method for wireless communication according to the present invention comprises transmitting from a mobile unit a code modulated signal, such as a CDMA signal, which is obtained by modulating original symbols by a predetermined pseudo-noise sequence. The original symbols represent an original information signal. A base station antenna array then receives in parallel N complex valued signal sequences from N corresponding antenna elements. Each of the N signal sequences are then correlated with the pseudo-noise sequence to despread and select N received signals comprising N received symbols corresponding to a common one of the original symbols. The N received symbols are then transformed in parallel to obtain N complex-valued transformer outputs which are then correlated collectively with a set of complex array calibration vectors to obtain spatial information about the signal. Each array calibration vector represents a response of the antenna array to a calibration signal originating in a predetermined direction relative to the base station. The above steps are repeated to obtain spatial information about multiple signal components corresponding to the same mobile. This spatial information is then used to spatially filter subsequent complex valued signal sequences. The filtered signal is then demodulated to obtain a symbol from the original information signal.

The original symbols are selected from a finite symbol alphabet. In a preferred embodiment, the finite alphabet contains not more than 64 symbols and the calibration vectors comprise complex valued components having 1-bit plus sign real part and 1-bit plus sign imaginary part. This simple representation allows computing the correlation via addition without the need for computationally complex multiplications. In one embodiment, the correlating step yields spatial information about multiple signal components from the mobile having small time separated signal parts (i.e. having a time spread less than one chip). Another embodiment of the invention includes the step of tracking time and angle information of the multiple signal components.

The invention further provides for spatially filtering a downlink information signal in accordance with the spatial information about the multiple signal components that was determined from the uplink. The spatial filtering comprises assigning the mobile unit to a beam based on spatial information about the mobile. This spatial information comprises directional and distance information about the mobile. The downlink beams are a dynamically adaptive set of overlapping broad and narrow beams such that closer mobiles are assigned to broader beams and more distant mobiles are assigned to narrower beams. The set of beams are modified depending on the statistics of the spatial information of all mobiles served by the base station in order to optimize system performance. In the preferred embodiment, the transmitting of the downlink beams is performed in accordance with beamforming information comprising complex valued elements having 3-bit-plus-sign real part and 3-bit-plus-sign imaginary part.

The invention also provides a CDMA base station implementing the above method. The station comprises an antenna array having N antenna elements, and a set of N receivers coupled to the N antenna elements to produce N incoming signals. The base station also comprises a set of N despreaders coupled to the N receivers for producing from the N incoming signals N despread signals corresponding to a single mobile unit. A set of N symbol transformers is coupled to the N despreaders and produces a complex-valued output from the despread signals. A spatial correlator coupled to the N symbol transformers correlates the complex-valued output with stored array calibration data to produce beamforming information for multiple signal parts associated with the mobile unit. In the preferred embodiment, the array calibration data is composed of complex valued array response elements represented as bit-plus-sign imaginary parts and bit-plus-sign real parts. A receiving beamformer coupled to the spatial correlator and to the N receivers then spatially filters the N incoming signals in accordance with the beamforming information. A RAKE receiver (or other equivalent receiver) coupled to the receiving beamformer produces from the spatially filtered signals an information signal. In one embodiment, the base station also includes a tracker coupled to the spatial correlator and to the receiving beamformer. The tracker tracks multiple signal parts and optimizes the performance of the receiving beamformer.

In the preferred embodiment, the base station also includes a transmitting beamformer coupled to the spatial correlator. The transmitting beamformer generates spatial beams in accordance with the beamforming information to increase system capacity. The spatial beams are a dynamically calculated set of downlink beams comprising narrow beams and overlapping broad beams such that the narrow beams are phase matched to the overlapping wide beams. The spatial beams are selected such that more distant mobiles are assigned to narrower beams and closer mobiles are assigned to broader beams.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
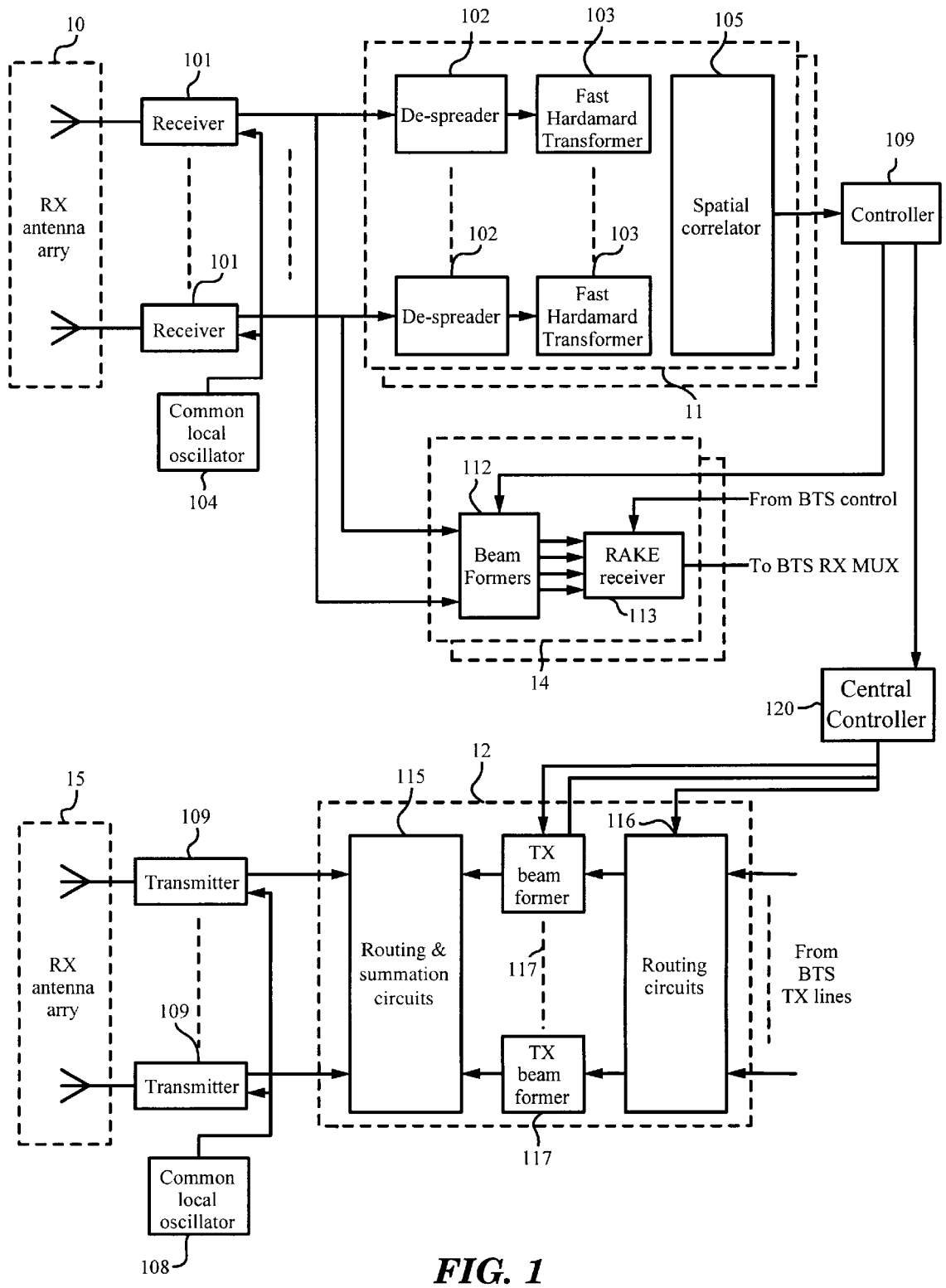
FIG. 1 is a block diagram showing a general view of the system architecture of a base station according to an embodiment of the invention.

FIG. 1 provides a general view of the system architecture of a base station according to the present invention. The base station comprises a receiving antenna array 10 having N antenna elements. In this embodiment, the system also comprises a separate antenna array 15 for transmission. Using antenna duplexers, however, the arrays can be combined, as is well known in the art. The embodiment allows for low cost duplexers and antenna filters since much less power is required per element to provide the required effective radiated power (ERP) due to beam forming. Preferrably, the number N of antenna elements is approximately 16.

Each of the N antenna elements is coupled to a corresponding one of a set of N conventional receivers 101. Each receiver down-converts an incoming signal in frequency and digitizes it to produce a received signal having I & Q (in phase and quadrature) signal components. In this embodiment, the receivers are coherently tuned by a common local oscillator 104 to allow for both phase and amplitude data measurement, thereby producing, at any given instant, an N-dimensional received signal vector having complex valued components. Alternatively, a calibration signal of fixed frequency can be injected to all receiver channels simultaneously with the received signal, allowing for continuous estimation of the phase and amplitude difference among the receivers. The calibration signal can be differentiated from the received signal since it is not spreaded and can have a very low level since its integration can be very long. Specific relevant receiver designs are presented in U.S. Pat. No. 5,309,474.

The received signal vector from the N receivers 101 is fed to a set of L channel estimators 11 and also to a corresponding set of L receiver banks 14. Each channel estimator 11 and corresponding receiver bank 14 is used to estimate the channel and receive the signal from a single mobile unit. Thus the maximum number of mobiles that can simultaneously be served by the base station is L. In a preferred embodiment, L is at least 100. The estimators 11 are identical to each other in both structure and principles of operation. Similarly, the receiving banks 14 are also identical. Accordingly, the following description is limited to a single estimator 11 and its corresponding receiver bank 14 which serve to estimate the channel of a single mobile unit and receive its signal.

In the preferred embodiment, channel estimator 11 comprises a set of N despreaders 102, a corresponding set of N fast Hadamard transformers (FHTS) and a spatial correlator 105. The despreaders 102 are conventional code-correlators described in detail, for example, in U.S. Pat. No. 5,309,474. Each of the N despreaders correlates a single component of the received signal vector with a pseudo-noise (PN) code sequence assigned to the associated mobile in accordance with the IS-95 CDMA standard. Each code correlator uses a variable time offset (synchronized with the other code correlators in the same bank) to separate multipath parts that arrive with at least one PN chip period difference. The following description discusses the processing of one multipath part. All multipath parts that are strong enough to be isolated are processed identically.

Each correlator 102 outputs a despread signal corresponding to one multipath part of the signal from one mobile received at one antenna. This despread signal is fed into a fast Hadamard transformer (FHT) 103. The FHT used in the present invention is identical to conventional FHTs (described, for example, in U.S. Pat. No. 5,309,474), except that the FHT of the present invention retains the complex phase information of the input. In other words, whereas the standard FHT outputs are converted to magnitudes, the FHT used in the present invention outputs complex numbers, thereby preserving both phase and amplitude data. Each FHT in this embodiment has 64 complex outputs, whose magnitudes represent the degree to which the despread signal correlates to each of the 64 symbols in a predetermined symbol alphabet. In the preferred embodiment, the symbol alphabet is a set of 64 orthogonal Walsh symbols.

For a given symbol received at the array 10 (in IS-95, a symbol period is approximately 205 microseconds), the signals received at the N antenna elements are, separately and in parallel, passed through N respective receivers 101, despreaders 102, and transformers 103, while retaining the relative phase information of the signals. The collection of N FHTs together produce an N×64 signal matrix B of complex elements. Each column of B is an N-dimensional vector, called the spatial response vector, whose N components represent the correlation of one Walsh symbol with the signal received at the N antenna elements. The matrix B is fed column-by-column to the spatial correlator 105 following timing synchronized to the Walsh symbols.

As will be described in detail below in reference to FIG. 2, spatial correlator 105 correlates the signal matrix B with an array calibration matrix A to produce a correlation matrix C that represents the correlations of the signal received at the antenna array with both a set of predetermined directions and a set of predetermined symbols. From an analysis of the matrix C the correlator produces a signal angle of arrival (AOA), and a scalar value (AOA quality) that is proportional to the "purity" of the wave front and the signal level. This data is transferred to a controller 106 that uses it to determine the best uplink beam coefficients for this particular signal part. Typically, this entire process is performed for the four strongest multipath parts. In addition, time of arrival (TOA) and AOA certainty data are produced, allowing for the generation of a spatially matched filter that contains beamforming information for each signal part. The functions of the channel estimator 11 described above are performed in parallel in all the other channel estimators for the other mobiles being handled by the base station.

The controller 106 receives beamforming information from each of the channel estimators 11. Thus controller 106 obtains spatial information regarding all the signal parts from all the mobiles. The controller 106 then downloads this information, in the form of coefficients, to the receiving banks 14 which use the spatial information from the channel estimators 11 to improve the reception of the signals from the mobiles. Each receiving bank 14 comprises beam formers 112 to form narrow beams towards the signal parts associated with a single mobile. Because the strong signal parts are selectively detected, the beam former creates a well matched spatial filter for the incoming signal, including its multipath components. The beamformers 112 feed spatially filtered signals to the four fingers of a conventional IS-95 RAKE receiver 113 (described in U.S. Pat. No. 5,309,474). It should be noted, however, that the beam former outputs can be fed to other receiver types. As a result of the spatial filtering process described above, the carrier-to-interference (C/I) ratio is significantly improved over conventional CDMA systems. The improvement in C/I is about the ratio between the effective beamwidth created (about 10 to 30 degrees) to the existing antenna beams (about 100 to 120 degrees). Note that the AOA and TOA data are also transferred to the central controller 120 where the system determines the most optimal downlink beams configuration. The downlink process will be discussed later, as part of the explanation of FIG. 4.

Although the preferred embodiment uses an IS-95 based architecture, the above process can be implemented with any wireless protocol that makes use of a finite alphabet or training sequence. For example, in GSM systems a training sequence is available in every wireless burst. Since the training sequence is known, a correlation between the incoming signal and a stored training sequence at the receiver will produce same results as described above (provided frequency error is not too great relative to the sequence length). The correlator 102 and the Hadamard transformer 103 are replaced in this case by a training sequence correlator (convolver). Since there is only one possibility for a training sequence, it is not required to try for many possibilities as done by the Hadamard transformer in the preferred embodiment.

Figure 2:
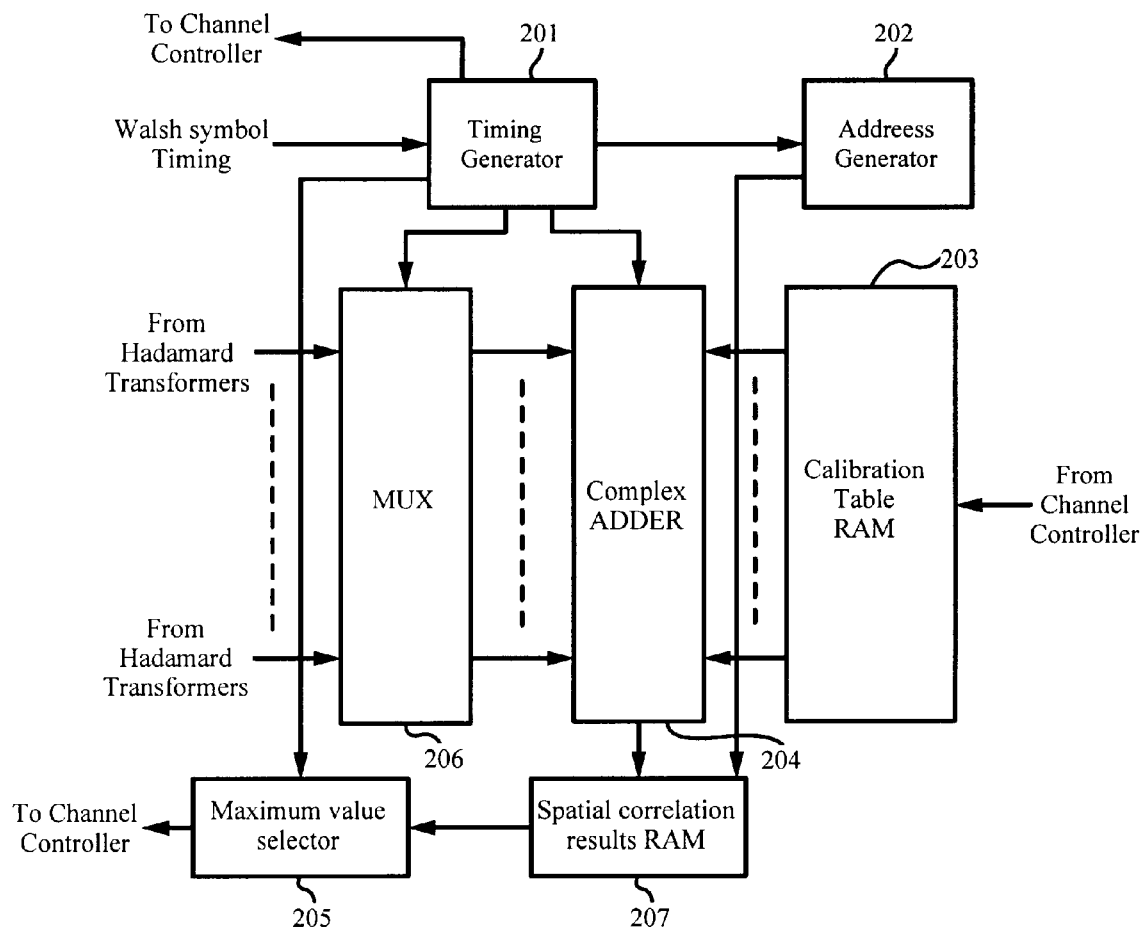
FIG. 2 is a block diagram showing the details of the Spatial Correlator illustrated in FIG. 1.

FIG. 2 illustrates the details of the spatial correlator 105. In this embodiment the spatial correlator is a stand-alone unit. Due to redundant functionality between this unit and the current implementation of IS-95 RAKE receiver, however, the spatial correlator can be integrated with the RAKE receiver. The preferred embodiment is optimized to IS-95 (uplink utilizing M-ary modulation), however, any signal that has either a finite alphabet (limited number of symbols) or a training sequence can utilize the same idea. The use of the known signal structure facilitates simple array response vector determination and eliminates the necessity for complex covariance matrix calculation and analysis. Hence, this approach can be utilized for GSM and TDMA wireless air-interfaces as well.

The columns of the signal matrix B (i.e. the spatial response vectors from the FHTs) pass through a MUX 206 and are then correlated with the columns of the array calibration matrix A which is stored in a RAM 203. In abstract terms, the correlation process is performed by multiplying the conjugate-transpose of the calibration matrix A by the signal matrix B. The result is a correlation matrix $C=A^H B$. It is important to note that this abstract calculation may be implemented in many different ways, all of which are mathematically equivalent to each other. The calibration matrix A is also known as the array manifold and is generated by measuring the antenna array response in antenna test range. Each column of A represents the response of the antenna array in one of a predetermined set of directions. For example, if the angular space is divided into 360 directions, then each of the 360 columns of A is an N-dimensional vector representing the response of the N antenna array elements in a given direction from the array. In the computation of the matrix C, these 360 vectors are spatially correlated with the 64 columns of the signal matrix B to produce a 360×64 element matrix, where element i,j represents the correlation of the received signal with the j$^{th}$ symbol in the i$^{th}$ angular direction.

In the preferred embodiment, the correlation is performed very efficiently through the use of a unique and simple calibration table representation which allows the matrix multiplication to be implemented without any multiplications. Each complex valued entry of the calibration table matrix A is quantitized such that both real and imaginary parts are each represented by two bits only. More specifically, each part is represented by one numerical bit plus one sign bit, thus: (0, 0)=−0, (0, 1)=+0, (1, 0)=−1, (1, 1)=+1. Each complex valued entry is therefore represented by just four bits. The reduced resolution in this simple quantization scheme is compensated by increasing the number of array elements to about twice relative to current base station arrays. This simple bit-plus-sign data structure allows the vector dot products between the matrix columns to be calculated using a complex adder 204. In conventional implementations, the vector dot product would require a collection of N multipliers. The technique of the present invention, therefore, dramatically simplifies the implementation of the spatial correlation operation.

A timing generator 201 synchronizes the spatial correlator process to the Walsh symbol period (i.e. the end of the Hadamard transform) that is derived from the base station pilot timing. The N×64 signal matrix is latched into the MUX circuit 206 which provides the column vectors to the complex adder 204 one at a time. For each vector, the complex adder 204 performs separate correlations of the vector to every one of the 360 columns of the calibration matrix. The because the calibration table data are only 0, 1, or −1, they are used in the complex adder to decide whether to null, add, or subtract each element in the vector. A RAM address generator 202 is driven also by same timing generator 201 to synchronize the presentation of 360 columns of calibration data with each lached vector.

Note that the number of array elements N does not change the correlation matrix dimensions, which are determined only by the number of predetermined symbols in the alphabet and the number of predefined angular directions. The correlation matrix C is stored in a spatial correlation RAM 207 and processed by a maximum value selector 205 that is a simple serial comperator in the preferred embodiment. The end result of the spatial correlator process is the best expected AOA for the selected signal part and the associated "inner product" value (used as a certainty factor). This result is reported to the controller 106 only if a preset threshold has been crossed. This threshold value is updated from time to time as necessary. When the threshold has been crossed, the controller registers the time offset associated as the signal part TOA. This information is used to estimate the mobile unit range from the base station. It is possible to identify more than one maximum at a time utilizing a recursive process: after identifying the largest value in the correlation matrix, the neighboring matrix elements are ignored (ignoring the neighboring elements minimizes the probability for "non peak" selection) and another "peak" search is executed. This feature allows the identification of multipath parts that cannot be differentiated in time alone (as done in existing RAKE receivers), allowing for beam forming reception of small time spreaded multipath. This approach has great advantage for close to BTS mobile unit communication.

The threshold value is calculated by averaging the reported results over long averaging period "window". For example, K reported results are accumulated at the controller and the accumulated result is divided by K. Since most of the reported results are generated by non-time correlated elements, the results are "noise like" and averaging them provides a good estimate of the channel noise level. Since the channel noise is a linear function of the number of active mobile units, this level needs to be updated from time to time as stated.

Figure 3:
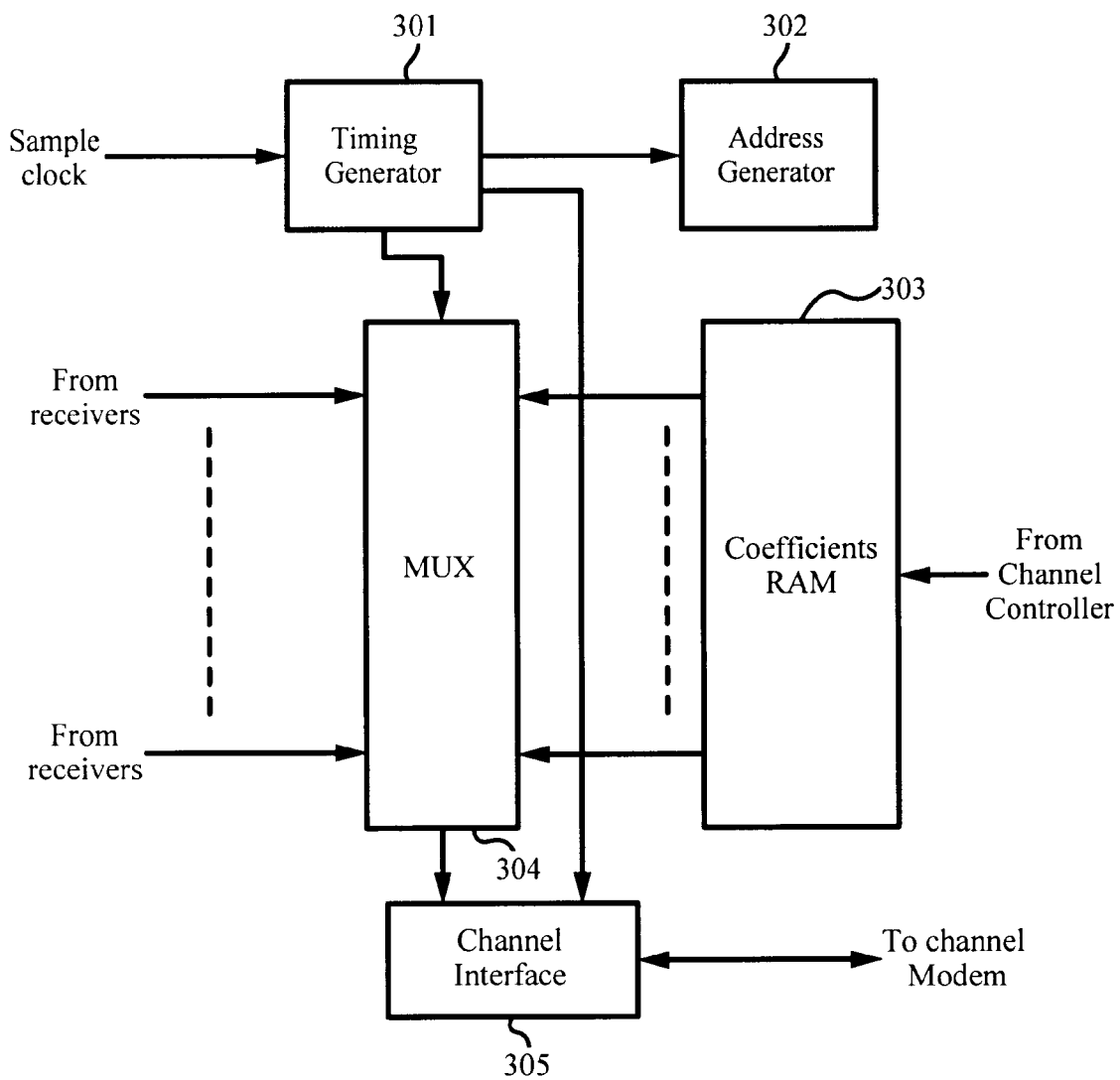
FIG. 3 is a block diagram showing the details of the uplink beam former illustrated in FIG. 1.

FIG. 3 details the uplink beam former 112 of FIG. 1. In this embodiment, the uplink beamformer is presented as a stand alone unit. However, it is possible to integrate the beam former into the channel estimator due to the "bit plus sign" arithmetic that makes it a very low gate count device. Signal outputs from the N base station receivers 101 are fed into a complex adder 304 for beamforming. Since the data rate for IS-95 is about 10 Mega-samples per second, the complex adder 304 can execute at least 4 vector sums per one vector data sample using present technology. The beamforming coefficients are downloaded from the controller as described above into a coefficient RAM 303. A timing generator 301 and an address generator 302 cause the coefficients to "rotate" into the complex adder. The coefficients are used as described above in reference to the spatial correlator of FIG. 2 to form a dot product using only complex addition. The vector summation result is fed into an interface unit 305 for transferring the result to the RAKE receiver modem. In other embodiments, any finite alphabet or training based protocol based modem could be used. The effect of the beamformer is to spatially filter the incoming signal to preferentially select for signals arriving from the known directions of the signal parts of a particular mobile unit. Signals from other directions are attenuated, and the reception of the desired signal is naturally improved.

Figure 4:
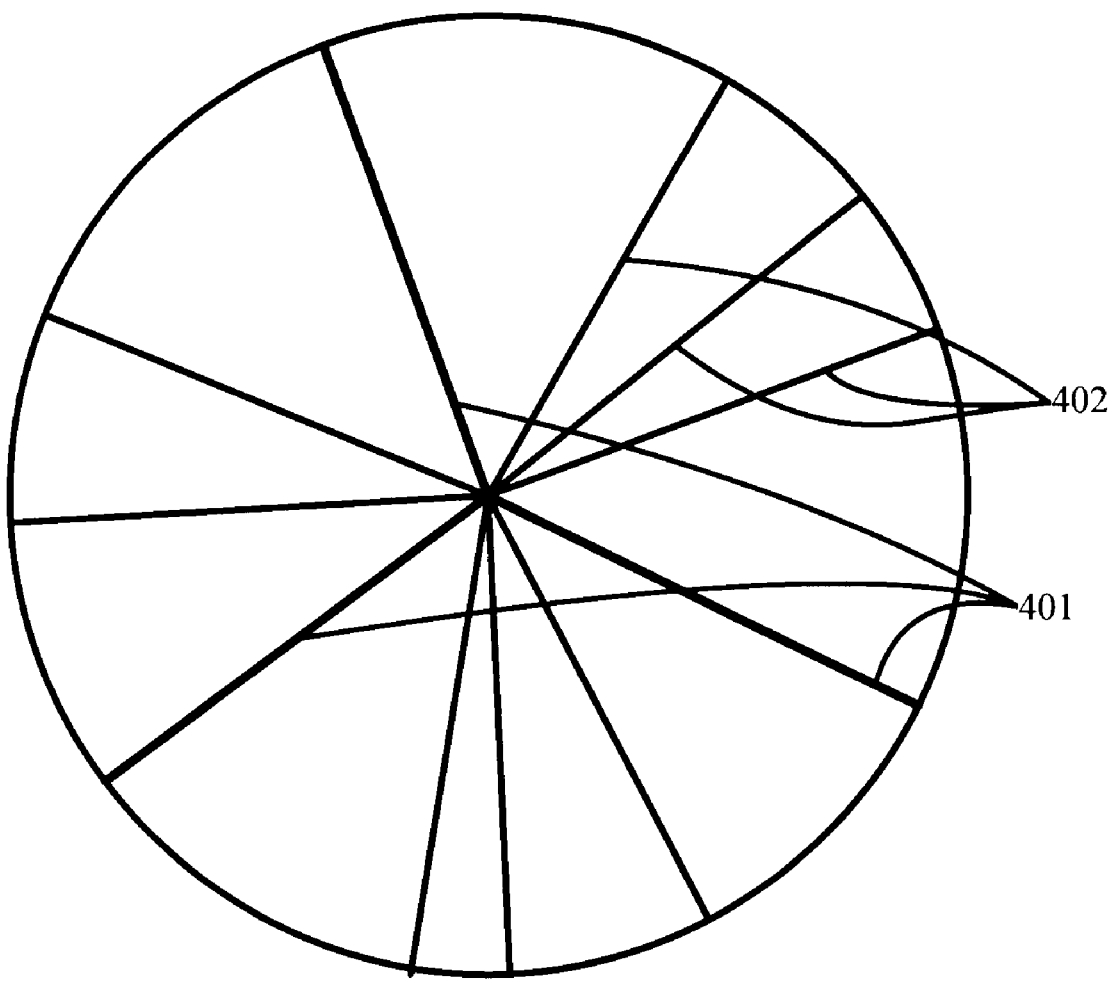
FIG. 4 is a diagram of the downlink beams configuration illustrating an example of a spatial distribution of downlink beams.

FIG. 4 illustrates an example of a spatial distribution of downlink beams. Downlink management is quite different from the uplink since IS-95 is not a symmetrical protocol and uplink frequency is different from the downlink frequency by at least 60 MHz (cellular). The difference in frequency causes the uplink and downlink channels to be non-correlated. The AOA & TOA of the uplink and downlink, although statistically similar, may differ significantly. Hence, the downlink can be only statistically estimated based on data collected in the uplink, as described above. In addition, the downlink requires broadcasting of a pilot signal to associated mobile units. As a result, individual downlink beams are not possible; only "mobile group" beams are realizable. Hence, the downlink approach is based on a combination of wide and narrow beams determined by data collected in the uplink. The beam configuration is determined by the mobile unit distribution around the base station. The wide beams are required to assure proper coverage at closed proximity to the base station where most of the downlink signal arrives to the mobile unit by way of scattering from nearby reflectors. The system adjusts the wide beams 401 to assure proper coverage for the mobile units close to the base station. The narrow beams 402 are adjusted mainly to accommodate "far away" mobile units. Since most of the mobile units will be in the outer coverage area, the narrow beams are expected to service the majority of the mobile units. Increasing the number of downlink beams causes the increase of softer handoff, thereby countering the increase in capacity. Hence, assigning beams in the downlink must be done very carefully.

The increase in downlink capacity can be estimated as follows:

$$Q*P+Q*P/N+X*P+X*P/N+(Q(1-P)/N+X(1-P)/N)*(1+B)=Q$$

$$\Psi = \frac{Q+X}{Q} = \frac{1}{P+P/N+(1-P)(1+B)/N}$$

We assume a uniform mobile unit distribution, and a maximum illumination of Q, that is the maximum number of simultaneous transmission channels including softer handoff.

The term Q*P is the number of mobile units that come in with high angular spread, called "Wide Angles". Q*P/N is the portion of the portion of Wide Angles that are within the narrow beam, and are all in softer handoff, thus, adding to the illumination in the overlapped sector twice.

If, as a result of the beams combination X mobile units can be added, X*P additional Wide Angle type are added (assuming P remains as before), out of, X*P/N are following the same rule as for the Q*P/N above.

In the narrow beam space, we get Q(1−P)/N+X(1−P)/N mobile units, but due to some handoff caused by the overlap we must increase the value of their illumination by factor 1+B. B can be kept small since outer cell associated mobile units will naturally prefer the narrow beams.

Figure 5:
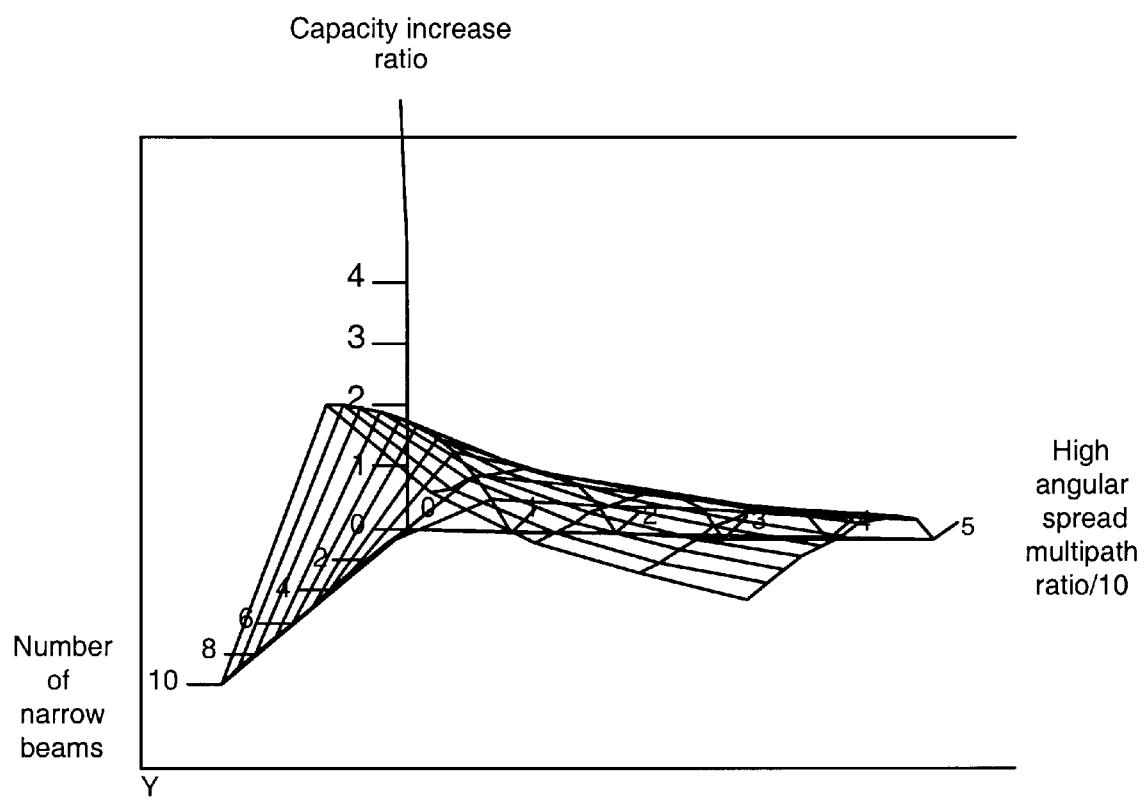
FIG. 5 is a graph representing the capacity increase ratio with respect to both the number of narrow beams and the probability of wide angular spread multipath with softer handoff probability fixed at 20%.
Figure 6:
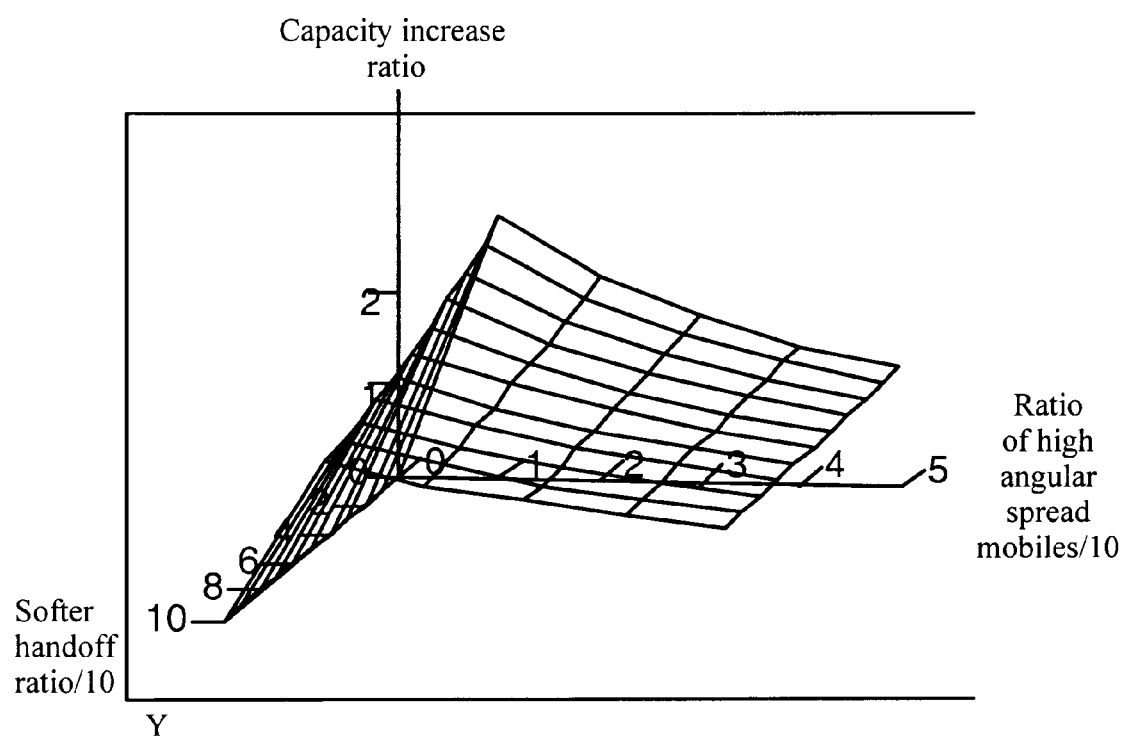
FIG. 6 is a graph illustrating the capacity increase ratio as a function of handoff probability and the wide spread multipath probability for 4 narrow beams.
Figure 7:
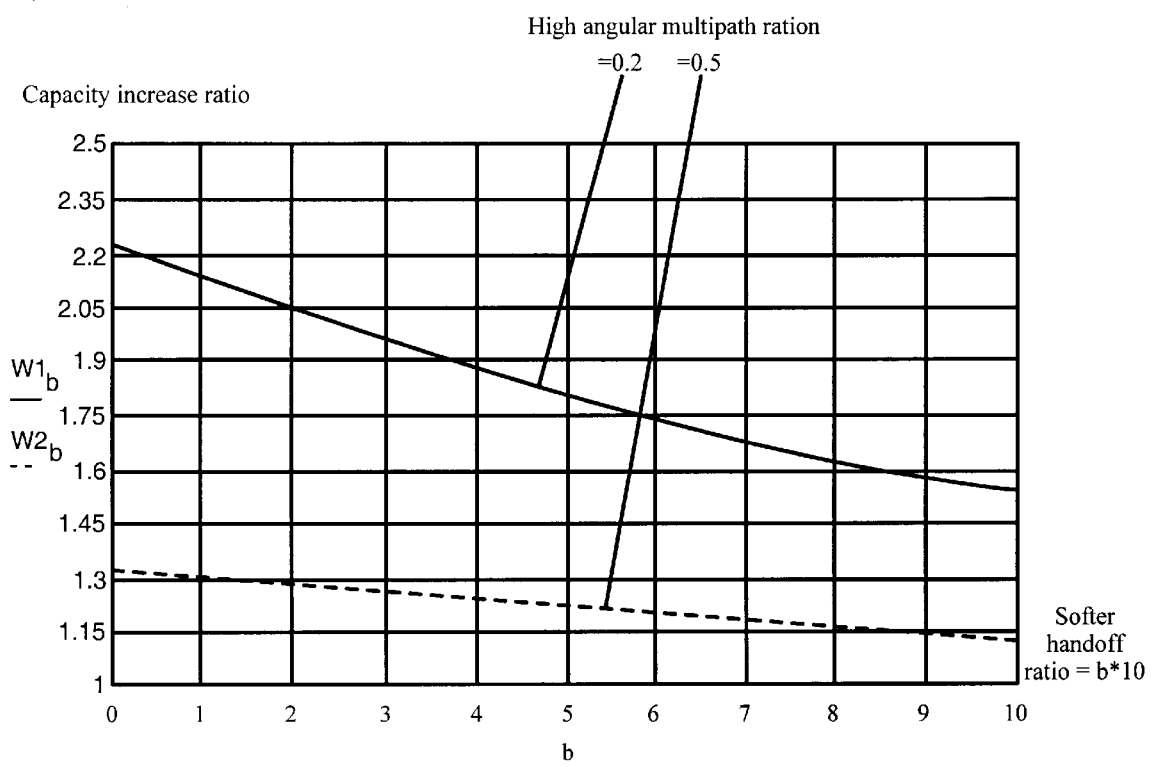
FIG. 7 is a graph depicting two plots illustrating wide angular spread multipath for variable handoff ratio and 4 narrow beams.

FIG. 5 is a graph of the capacity increase ratio with respect to both the number of narrow beams and the probability/10 of wide angular spread multipath with softer handoff probability fixed at 20%. FIG. 6 is a graph of the capacity increase ratio as a function of handoff probability/10 and the wide angular spread multipath probability/10 for 4 narrow beams. FIG. 7 is a graph of two cases of wide angular spread multipath for variable handoff ratio and 4 narrow beams.

Figure 8:
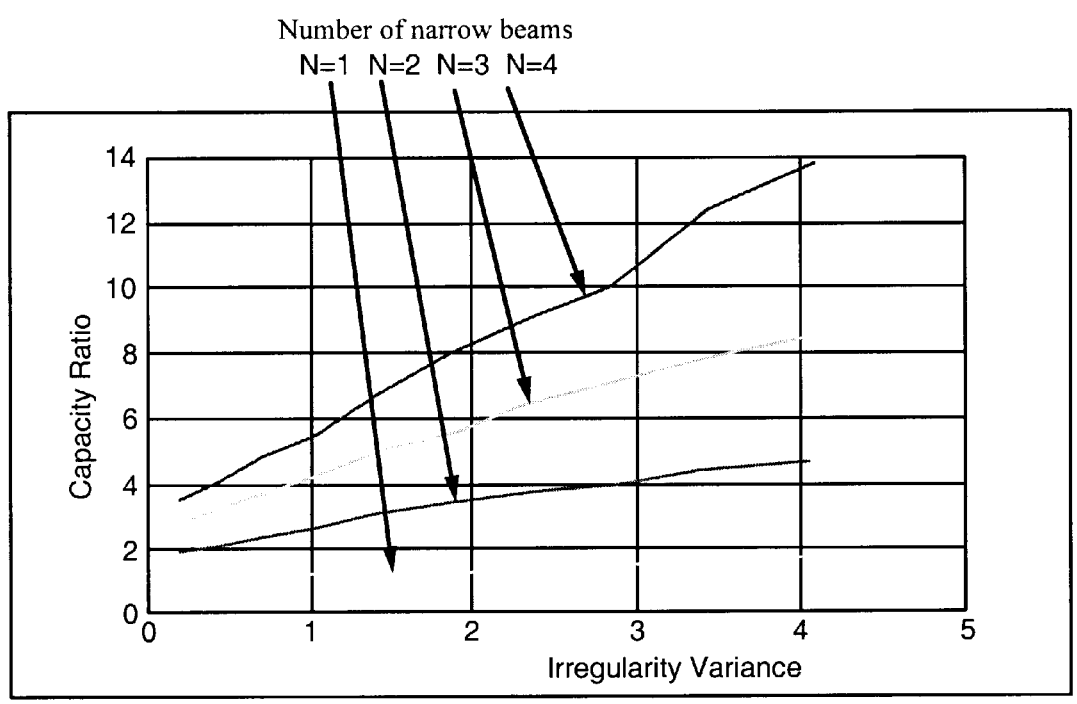
FIG. 8 is a graph depicting the plots illustrating the expected capacity ratio for different density variance of mobile unit.

Following the above analysis, the enhancement of capacity for 4 narrow beams within one wide beam is approximately two. If the mobile unit distribution is non uniform, the enhancement can be even higher. FIG. 8 is a graph of the expected capacity ratio for different density variance of mobile units. This improvement requires the narrow beam borders to be adjusted to avoid mobile unit density peaks. This adjustment function must be gradual to avoid excessive handoff while changing the beams.

Figure 9:
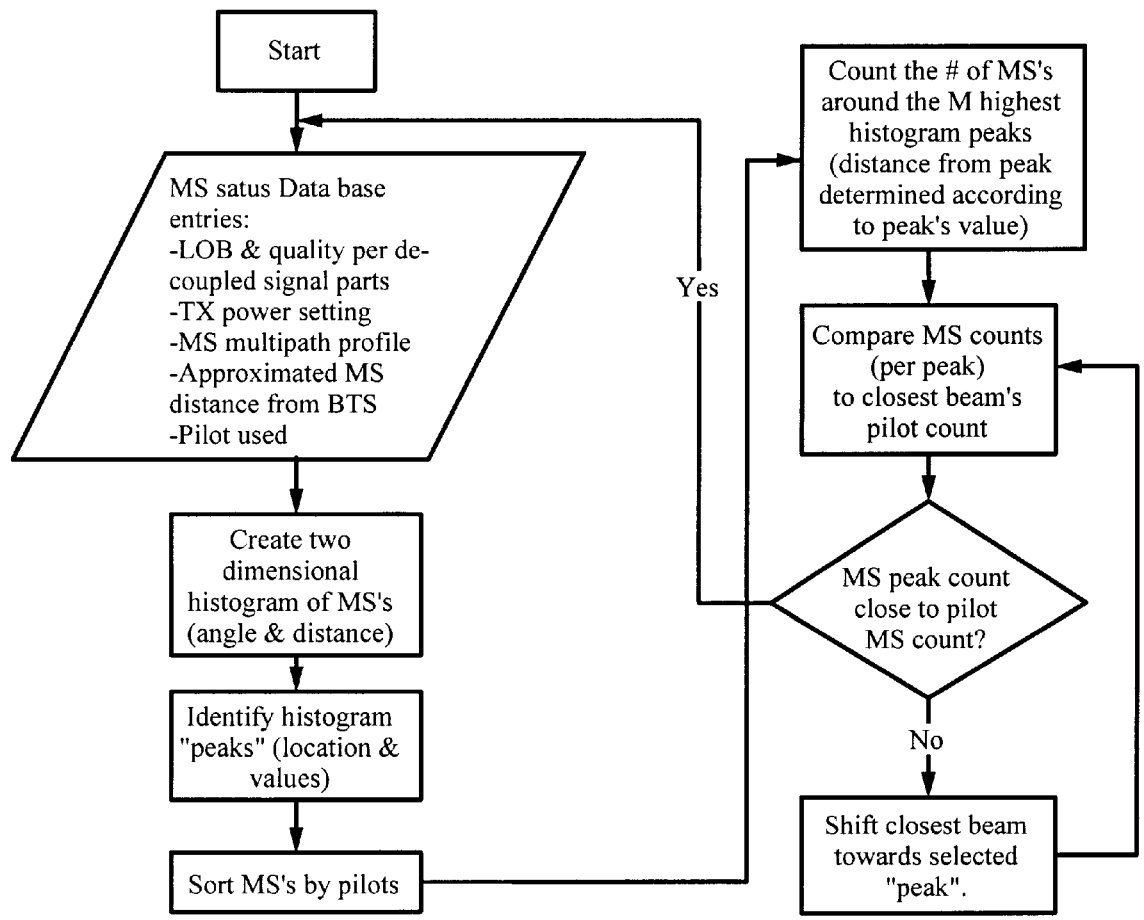
FIG. 9 is a flow chart of the downlink beam determination process.

FIG. 9 presents the a flowchart of the downlink beamforming determination process. Mobile unit spatial data is collected and stored in memory. This data is then used to evaluate the mobile unit distribution around the base station by sorting the data into a two dimensional histogram. The histogram "peaks" are identified as follows: a two dimensional "smoothing" filter is executed to eliminate noisy histogram "spikes" and a common two dimensional "peaks search" process is utilized. For a system that is capable of forming M downlink beams, M "peaks" are sorted. The following is a closed loop process that adjusts the boundaries of the downlink beams and equalizes the number of mobile units associated with them. Narrowing the beams will cause some mobile units to handoff to different pilots leaving only mobile units close to the selected "peak" hanging on to the associated pilot. This process proceeds at a very slow pace to avoid excessive handoff.

Figure 10:
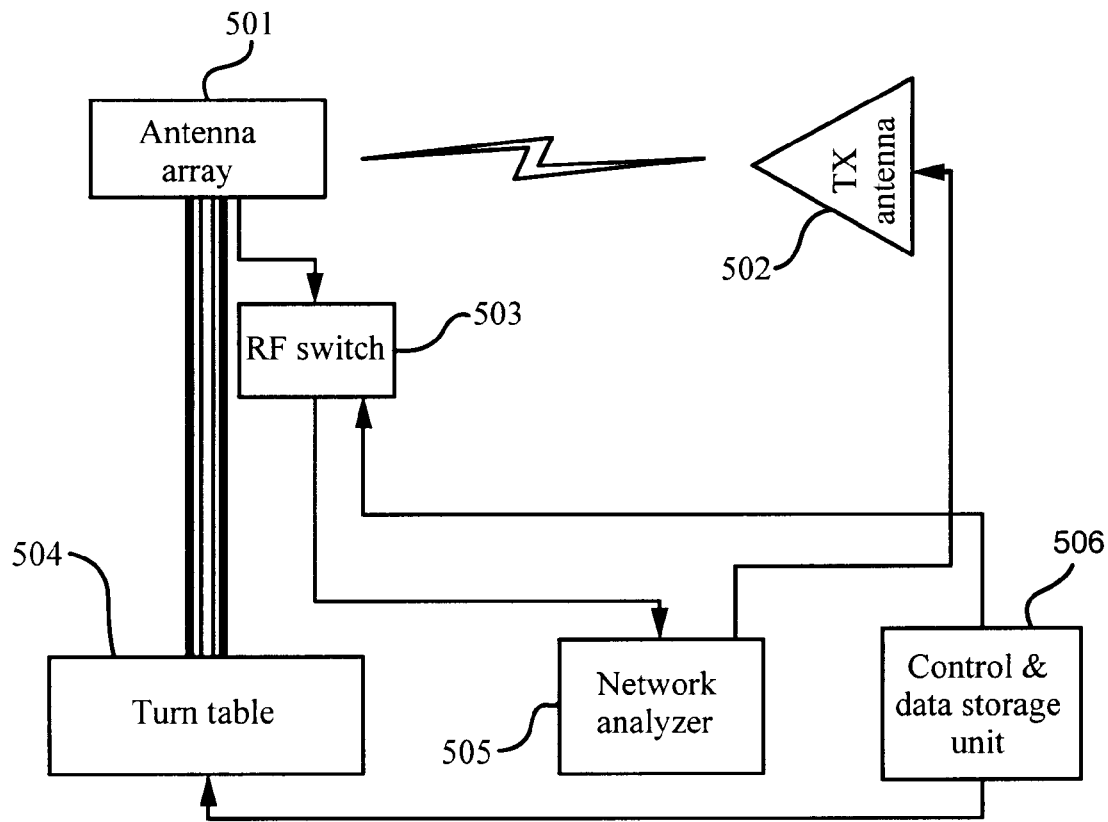
FIG. 10 is a schematic diagram of an apparatus for generating antenna array manifold.

FIG. 10 presents an aparatus to generate an antenna array manifold (calibration table). An antenna array 601, incorporates a collection of antenna elements, installed on a support mast that is connected to a turn-table 504. The controller 506 commands the turn-table to rotate in predetermined angle steps. A network analyzer 505 transmits through a transmitting antenna 502 an RF signal which is received by the antenna array 601. The signals received at the elements in the antenna array are routed through an RF switch 503 to the network analyzer for measurement. In the preferred embodiment, the antenna array is circular but the invention can be implemented with any arbitrary array shape. The RF signal collected for each antenna element in this case can be written as follows:

$$V_{k,\theta} = F_{k,\theta} \cdot e^{j\frac{2\pi(R\cos(2\pi k/M - \theta)}{\lambda}}$$

V represents the array manifold function, k is the element number and θ is the relative angle of arrival (created by rotating the array relative to the RF signal source). M is the total number of antenna elements in the circular array. λ is the RF signal wavelength. The data is collected and stored in a data storage unit and controller 506.

Figure 11:
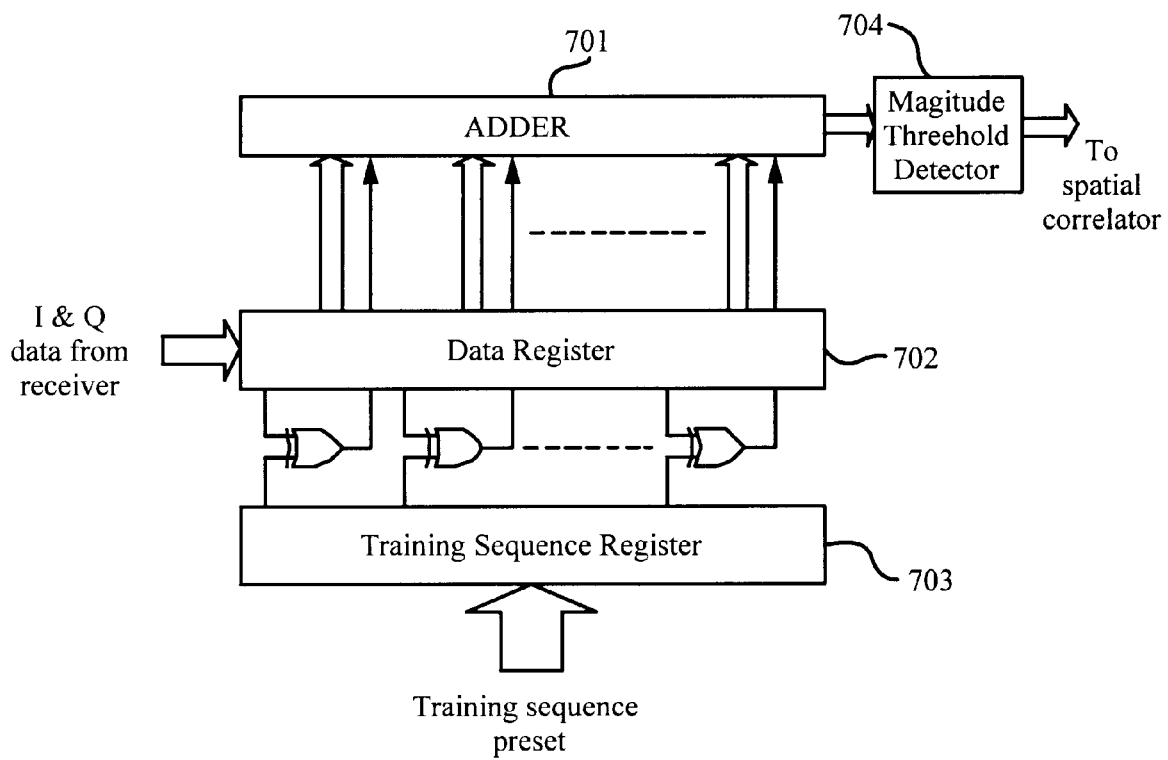
FIG. 11 is a schematic diagram of a trainin sequence convolver according to another embodiment of the present invention.

FIG. 11 Presents an embodiment illustrating a training sequence convolver, which may be used instead of the despreader 102 and FHT 103 in some wireless standards. A data register 702 is a first-in-first-out (FIFO) unit with a word bandwidth that is matched to the receiver I & Q output width. The I & Q samples are shifted through the data register 702 in two's complement format. XOR gates are used to compare the most significant bit of I and the most significant bit of Q with bits of a training sequence stored in a training sequence register 703. The resultant XOR output are fed to an adder 701 and used to determine whether to add or subtract each I & Q sample in the data register. The output of the adder is updated for every sample cycle and compared against a threshold in a magnitude threshold detector 704. When the threshold is exceeded, the I & Q values are registered as a component of the signal response vector that is then sent to the spatial correlator explained above.

Figure 12:
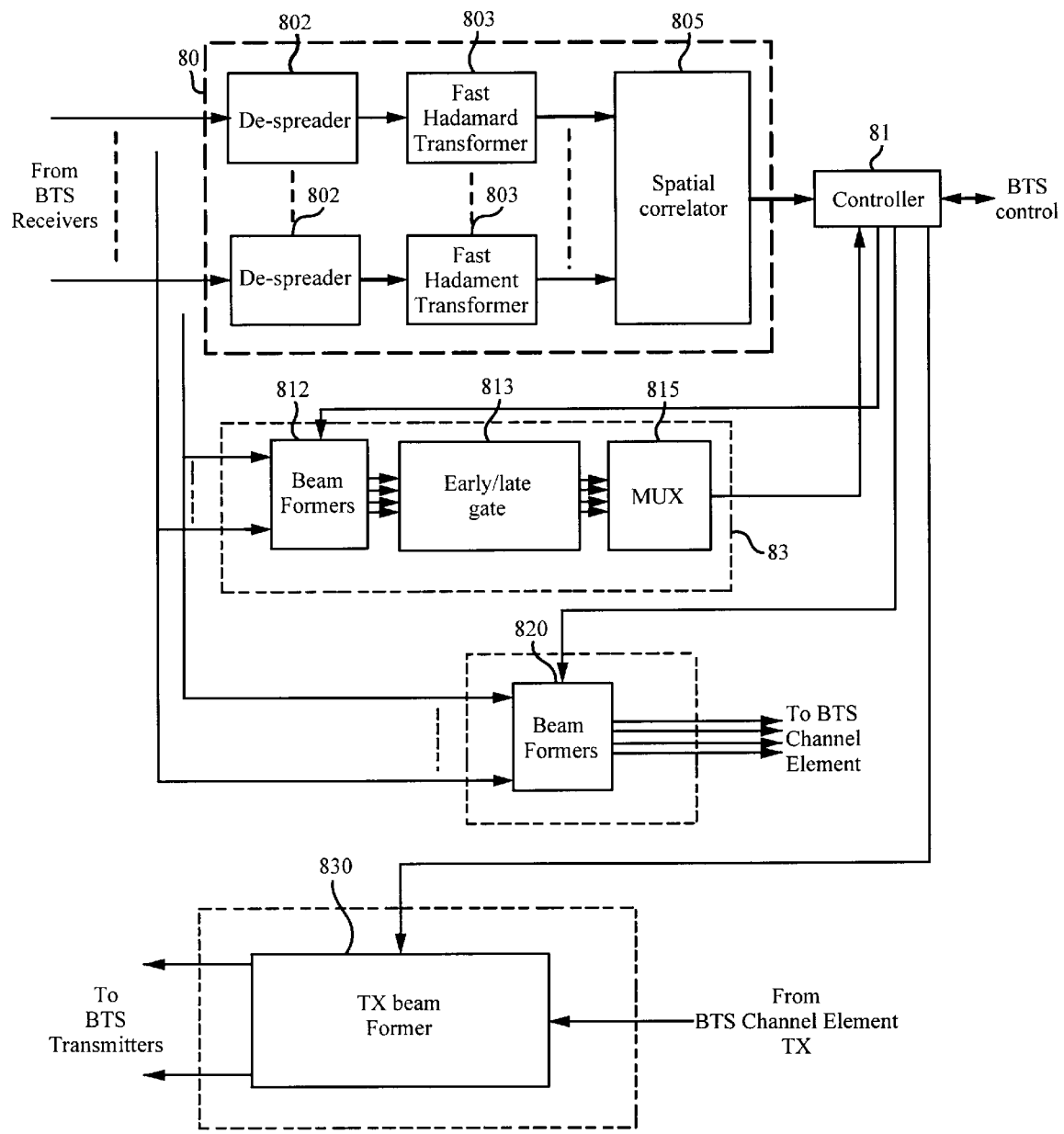
FIG. 12 is a block diagram of a Channel Estimator including both Searching and Tracking function according to another embodiment of the present invention.

FIG. 12 presents an embodiment of the invention that includes both searching and tracking functions (in angle & time). The addition of angular tracking increases the ability of the system to efficiently direct the receiving beams at all times. A searcher 80 acquires new multipath parts as before while a tracker 83 tracks them. The principle of operation of this embodiment is very similar to the embodiment described in FIG. 1. The main difference relative to FIG. 1 is the addition of the tracker 83. The N receiver outputs are fed in parallel to beamformer 812. The controller 81 downloads to the beam former 812 not just one, but two beamforming information sets for each signal part to be tracked. The two sets correspond to two adjacent columns in the calibration matrix. This allows the beam former to continuously "toggle" between two angularly adjacent beams.

The beam former output is fed into an "Early/late gate" module 813 known in the art. The result of the combined "toggling" beam former and the "Early/late gate" is in the form of four level values corresponding to: left beam/early time, right beam/early time, left beam/late time and left beam/late time. Since the tracker is designed to track four multipath parts simultaneously, the results are reported to the controller through a multiplexer 815. The controller 81 directs the beamformer and the "Early/late gate" to balance all the four values above the same level by exchanging the beam former coefficients and advancing/delaying the gate's clock. Angular tracking is achieved by equalizing the right and left associated results while the time tracking is achieved by equalizing the early late associated values. This embodiment assures sufficient integration for reliable tracking. The sets of coefficients are entirely replaced when the searcher finds a multipath part that generates a significant higher level outputs than the ones tracked. In this embodiment, each channel is assigned it's own downlink beamformer 830. Note also that this embodiment supports an individual beam for each active channel.

Figure 13:
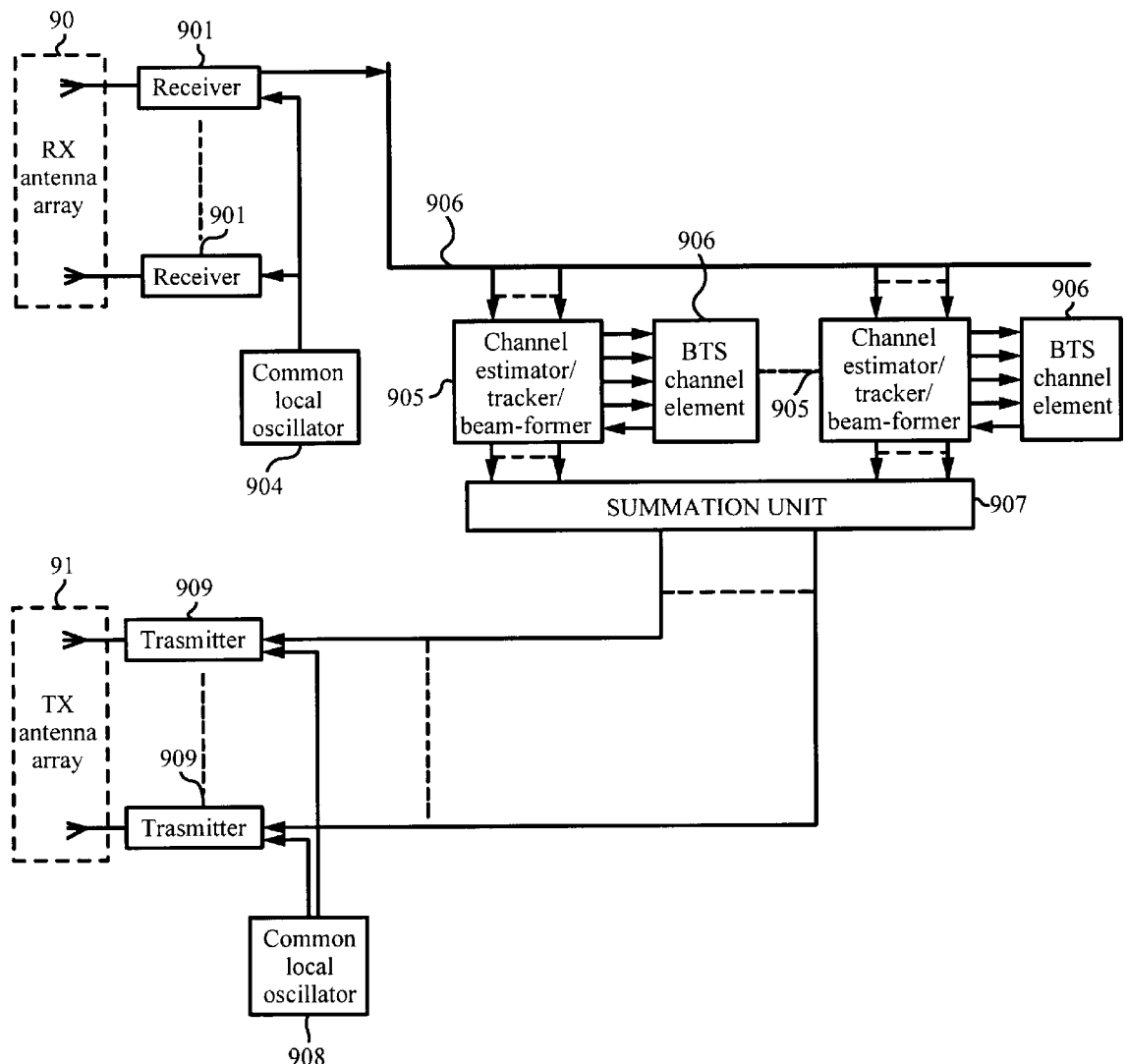
FIG. 13 is a block diagram of a base station employing channel estimators/trackers/beamformers illustrated in FIG. 12.

FIG. 13 presents an overview of a base station that employs channel estimators/trackers/beamformers described in FIG. 12. The antenna array 90 is coupled to a set of receivers 901 which are all driven by common local oscillator 904, as in FIG. 1. The receivers output is placed on a data BUS 910 to feed a plurality of channel estimators/trackers/beamformers 905, each of which provides a BTS channel element 906 with a plurality of signal parts. Element 906 can be a RAKE receiver/data transmitter of IS-95. The channel elements are feeding downlink data to the channel estimator/tracker/beamformers, which feed beamformed data to summation unit 907. The summation unit outputs summed beam formed data to the BTS transmitters 909 that are driven by common local oscillator 908. The transmitter outputs are radiated through transmitting antenna array 91.

The above embodiment of the downlink requires additional "pilots" when applied to a CDMA IS-95 base station. This may require some changes in the network control and network pilots allocation design. The following embodiment alleviates this requirement by distributing the overhead channels (pilot, paging and synch.) through a wide beam while the traffic channels are individually transmitted through narrow beams directed at the associated mobile units. This approach does not change the conventional BTS softer handoff profile, hence it does not require any changes in the network architecture.

This proposed arrangement is facilitated by careful array beam synthesis techniques that are well known in the art. In particular, the beams are constructed to be phase matched in the mobile unit's scattering region. The beams' coefficients are calculated to achieve identical wave-fronts between the pilot and the traffic signals, hence, allowing the current IS-95 coherent demodulation at the mobile unit. This "beam matching" is facilitated using beam synthesis based on a minimum root mean square approach. This approach allows for +/−10 degrees phase matching down to −10 dB points, which is sufficient not to degrade the performance of the coherent demodulator at the mobile unit.

The coefficients of the individual downlink beams are set as follows: the overhead data (pilot, synch and paging) are transmitted through fixed, relatively wide beams. The downlink traffic data beams are set to match the line of bearing as measured by the uplink channel estimator with sufficient width margin to compensate for bearing error (due to lack of correlation between up and down links). It should be noted that even relatively wide downlink traffic beams will provide for significant capacity increase.

Since the angular spread is getting larger as the distance to the base station decreases, the narrow beam width is estimated based on the estimated distance from the BTS. This distance is derived from the time delay as measured by a beam director.

Since the above approach is based on the statistical profile of the scattering region (various scattering models are considered), the system must provide for exceptions: at first, the allocated traffic narrow beam is made wider than needed, and as done with the forward power control, it is gradually narrowed based on the frame erasure rate (analogous to bit error rate) that is reported on the uplink. In case the frame erasure rate increases, the traffic beam is widened accordingly. This mechanism will also compensate for situations where the uplink angle of arrival (AOA) is very different from the downlink AOA.

As is evident from the various embodiments illustrated above, the present invention encompasses within its scope many variations. Those skilled in the art will appreciate that additional modifications may also be made to the above embodiments without departing from the scope of the invention. Accordingly, the true scope of the present invention should not be construed as limited by the details provided above for the purposes of illustration, but should be determined from the following claims and their legal equivalents.

I claim:

1. A method for wireless communication comprising:
   a) transmitting from a mobile unit a code modulated signal obtained by modulating original symbols by a predetermined pseudo-noise sequence, wherein the original symbols represent an original information signal;
   b) receiving at a base station antenna array N complex valued signal sequences received in parallel from N corresponding antenna elements;
   c) correlating in parallel each of the N signal sequences with the pseudo-noise sequence to select N received signals comprising N received symbols corresponding to a common one of the original symbols;
   d) transforming in parallel the N received symbols to obtain N complex-valued transformer outputs;
   e) correlating collectively the N transformer outputs with a set of complex array calibration vectors to obtain spatial information, wherein each array calibration vector represents a response of the antenna array to a calibration signal originating in a predetermined direction relative to the base station;
   f) repeating steps (b), (c), (d), (e) to obtain spatial information about multiple signal components;
   g) spatially filtering a subsequent set of N complex valued signal sequences in accordance with the spatial information about multiple signal components; and
   h) demodulating the spatially filtered subsequent set to obtain a symbol from the original information signal.

2. The method of claim 1 further comprising the step of tracking time and angle information of the multiple signal components.

3. The method of claim 1 wherein the original symbols are selected from a symbol alphabet comprising not more than 64 symbols.

4. The method of claim 1 wherein each of the N transformer outputs comprises a vector having M complex valued components representing correlations between a received symbol and M symbols of a symbol alphabet.

5. The method of claim 1 wherein the calibration vectors comprise complex valued components having 1-bit plus sign real part and 1-bit plus sign imaginary part, and wherein the correlating step comprises computing via addition only a vector dot product between the calibration vectors and the N transformer outputs.

6. The method of claim 1 wherein the correlating step yields spatial information about multiple signal components having a time spread less than one chip.

7. The method of claim 1 further comprising spatially filtering a downlink information signal in accordance with the spatial information about the multiple signal components, and transmitting the spatially filtered downlink information signal from the antenna array to the mobile unit.

8. The method of claim 7 wherein the spatially filtering comprises assigning the mobile unit to a calculated beam and generating the beam.

9. In a wireless communication system comprising a mobile unit and a base station having an N-element antenna array, a method for efficiently determining at the base station a spatial channel of the mobile unit, the method comprising:

a) calculating a transform of a symbol as received from a first antenna of the antenna array, wherein the calculation produces a first M-dimensional vector having complex valued components, where M is a number of predetermined symbols in a symbol alphabet;

b) performing step (a) simultaneously and in parallel for the symbol as received from N−1 additional antennas in the array, thereby producing a matrix B containing N row vectors of dimension M;

c) calulating the matrix product $C=A^H B$, where each of L columns of the matrix A is an N-dimensional vector containing a response of the N antenna array in one of L predetermined directions relative to the array; and d) determining from the matrix C a spatial direction of a signal part originating from the mobile.

10. The method of claim 9 wherein M<65.

11. The method of claim 9 wherein the matrix A has complex valued elements having 1-bit-plus-sign real part and 1-bit-plus-sign imaginary part, whereby the matrix product calculation is efficiently performed.

12. The method of claim 9 further comprising determining from the matrix C an additional spatial direction of an small time separated signal part originating from the mobile.

13. A method for wireless communication comprising:
transmitting an information signal from a mobile unit;
receiving the transmitted signal with an array of N antenna elements to yield a set of N received signals;
spatially correlating the N received signals with the contents of an antenna array calibration table to obtain directional information about the mobile unit, wherein the stored calibration table comprises complex valued elements having 1-bit-plus-sign real part and 1-bit-plus-sign imaginary part, whereby spatial correlation is facilitated; and
spatially filtering subsequent received signals from the mobile unit in accordance with the directional information to obtain corresponding transmitted information signals.

14. The method of claim 13 wherein the receiving step comprises digitizing, despreading and Hadamard transforming, separately and in parallel, N air signals coupled to the N antennas.

15. The method of claim 13 wherein the correlating step comprises calculating vector dot products between the N received signals and columns of the array calibration table having complex-valued elements in the form of a bit-plus-sign real part and a bit-plus-sign imaginary part.

16. The method of claim 13 further comprising the step of assigning the mobile to a calculated downlink beam based on the directional information.

17. The method of claim 16 wherein the calculated beam is selected from among a dynamically adaptive set of overlapping downlink beams of differing angular extent.

18. The method of claim 16 wherein the assigning step is further based upon distance information such that close mobiles are assigned to broad beams and distant mobiles are assigned to narrow beams.

19. A method for wireless communication comprising:
transmitting uplink information signals from a set of mobiles;
receiving the uplink signals with an array of N antenna elements to yield a set of N received signals;
processing the N received signals to obtain spatial information about the mobiles;
calculating downlink beamforming information based upon the spatial information, wherein the beamforming information comprises assigning each of the mobiles to one of a set of downlink beams, wherein the set of downlink beams comprises wide beams for nearby mobiles and narrow beams for distant mobiles, and wherein the wide beams overlap the narrow beams; and
transmitting downlink information signals to the mobiles in accordance with the calculated downlink beamforming information.

20. The method of claim 19 further comprising tracking the spatial information about the mobiles in angle and time.

21. The method of claim 19 further comprising modifying the properties of the downlink beams based upon the spatial information in order to optimize system performance.

22. The method of claim 19 wherein the transmitting is performed in accordance with beamforming information comprising complex valued elements having 3-bit-plus-sign real part and 3-bit-plus-sign imaginary part.

23. The method of claim 19 wherein the processing comprises Hadamard-transforming the N received signals and correlating the N transformed signals with an array calibration table.

24. The method of claim 23 wherein the array calibration table comprises complex valued elements having 1-bit-plus-sign real part and 1-bit-plus-sign imaginary part.

25. The method of claim 23 wherein the correlating comprises a matrix multiplication implemented as a complex addition.

26. A CDMA base station comprising:
an antenna array comprising N antenna elements;
a set of N receivers coupled to the N antenna elements to produce N incoming signals;
a set of N despreaders coupled to the N receivers, wherein the despreaders produce from the N incoming signals N despread signals corresponding to a single mobile unit;
a set of N symbol transformers coupled to the N despreaders, wherein the transformers produce complex-valued outputs from the despread signals;
a spatial correlator coupled to the N symbol transformers, wherein the correlator correlates the complex-valued outputs with stored array calibration data to produce beamforming information for multiple signal parts associated with the mobile unit;
a receiving beamformer coupled to the spatial correlator and to the N receivers, wherein the receiving beamformer spatially filters the N incoming signals in accordance with the beamforming information; and
a RAKE receiver coupled to the receiving beamformer, wherein the RAKE receiver produces from the spatially filtered signals an information signal.

27. The base station of claim 26 further comprising a transmitting beamformer coupled to the spatial correlator, wherein the transmitting beamformer generates spatial beams in accordance with the beamforming information.

28. The base station of claim 27 wherein the spatial beams are selected from a set of calculated beams comprising narrow beams and overlapping broad beams, where the narrow beams are phase matched to the overlapping wide beams.

29. The base station of claim 26 further comprising a tracker coupled to the spatial correlator and to the receiving beamformer, wherein the tracker tracks the multiple signal parts and optimizes the performance of the receiving beamformer.

30. The base station of claim 26 wherein the array calibration data comprises complex valued array response elements represented as bit-plus-sign imaginary parts and bit-plus-sign real parts.

31. A base station in a wireless CDMA communication system, the base station comprising:
- a) an antenna array comprising N antenna elements;
- b) a set of N radio frequency transceivers coupled to the N antenna elements; and
- c) an adaptive beamformer coupled to the N radio frequency transceivers, wherein the adaptive beamformer generates spatial beams selected from a set of calculated beams comprising narrow beams and broad beams, wherein the narrow beams overlap with, and are phase matched to the broad beams, and wherein the spatial beams control relative phases of signals transmitted by the transceivers from the antenna elements.

32. The base station of claim 31 further comprising a spatial correlator coupled to the adaptive beamformer and to the N transceivers, wherein the spatial correlator correlates received signal information with stored array calibration data to produce beamforming information, and wherein the adaptive beamformer uses the beamforming information to calculate the calculated set of beams.

* * * * *